United States Patent [19]
Tsukamoto et al.

[11] Patent Number: 5,833,571
[45] Date of Patent: Nov. 10, 1998

[54] CONTINUOUSLY VARIABLE TRANSMISSION

[75] Inventors: Kazumasa Tsukamoto, Toyota; Takeshi Inuzuka; Masashi Hattori, both of Anjo, all of Japan

[73] Assignee: Aisin AW Co., Ltd., Japan

[21] Appl. No.: 766,349

[22] Filed: Dec. 13, 1996

[30] Foreign Application Priority Data

Dec. 15, 1995 [JP] Japan .................................. 7-327664

[51] Int. Cl.$^6$ .......................... F16H 59/06; F16H 37/02
[52] U.S. Cl. .................... 477/44; 475/211; 475/212
[58] Field of Search .................... 477/46, 48, 47, 477/45, 49, 44; 475/211, 212; 474/11, 12, 13

[56] References Cited

U.S. PATENT DOCUMENTS

| | | | |
|---|---|---|---|
| 3,375,734 | 4/1968 | Lemons | 74/689 |
| 3,385,132 | 5/1968 | Browning | 74/689 |
| 3,552,232 | 1/1971 | Kress | 74/689 |
| 4,553,450 | 11/1985 | Gizard | 475/212 |
| 4,619,157 | 10/1986 | Sakai | 477/45 X |
| 4,644,820 | 2/1987 | Macey et al. | 74/689 |
| 4,864,889 | 9/1989 | Sakakibara et al. | 475/211 |
| 5,092,434 | 3/1992 | Smith | 192/32 |
| 5,669,846 | 9/1997 | Moroto et al. | 475/211 |
| 5,690,576 | 11/1997 | Moroto et al. | 475/211 |

FOREIGN PATENT DOCUMENTS

| | | |
|---|---|---|
| 733830 | 3/1996 | European Pat. Off. . |
| 6101754 | 4/1994 | Japan . |
| 6331000 | 11/1994 | Japan . |
| 7133858 | 5/1995 | Japan . |
| 7139608 | 5/1995 | Japan . |

*Primary Examiner*—Charles A. Marmor
*Assistant Examiner*—Ankur Parekh
*Attorney, Agent, or Firm*—Lorusso & Loud

[57] ABSTRACT

A continuously variable transmission is switchable between the low and high modes by changing engagement between two clutches. A sensor shoe which moves in association with a movable sheave of a primary pulley is provided with an indent and a protrusion formed at different locations on the sensor shoe. In addition, indents are formed on a spool of a low-high control valve. An interlock rod is provided between the sensor shoe and the low-high control valve. In a predetermined pulley-ratio region in the low and high modes, for example, on a low pulley-ratio side, as the movable sheave moves to the O/D side a base end of the interlock rod rides on the upper surface of the sensor shoe while its opposite end is engaged within one of the indents, thus mechanically locking the low-high control valve. In this way, switching between the low and high modes due to selective engagement of the low and high clutches can be inhibited.

8 Claims, 9 Drawing Sheets

FIG. 5

Clutch-Engagement Table

| Range | Clutch | $C_L$ | $C_H$ |
|---|---|---|---|
| P | | | |
| R | | ◯ | |
| N | | | |
| D | Low | ◯ | |
| D | High | | ◯ |

FIG. 9

H Mode

| D | | Narrowing Pressure | | |
|---|---|---|---|---|
| | | Pri>Sec | Pri=Sec | Pri<Sec |
| PWR ON | Up | ○ | | |
| | Down | | | ○ |
| PWR OFF | Up | ○ | (○) | |
| | Down | | (○) | ○ |

L Mode

| | | | Narrowing Pressure | | |
|---|---|---|---|---|---|
| | | | Pri>Sec | Pri=Sec | Pri<Sec |
| D | PWR ON | Up | ○ | | |
| | | Down | | (○) | ○ |
| | PWR OFF | Up | ○ | (○) | |
| | | Down | ○ | ○ | |
| R | Gear Neutral | | | | |
| | PWR ON | Up | ○ | (○) | |
| | | Down | | (○) | ○ |
| | PWR OFF | Up | ○ | | |
| | | Down | | | ○ |

※ N, P   C_H and C_L are Disengaged
           Pri = Sec

Combinations Avoided to Guarantee Forward/Backward Drive States

CONTINUOUSLY VARIABLE TRANSMISSION

BACKGROUND OF THE INVENTION

1. Field of the Invention

In general, the invention relates to a continuously variable transmission system including a belt-type continuously variable transmission unit which has primary and secondary pulleys, each comprising two sheaves, and a belt wound around the primary and secondary pulleys and, more specifically, to a mode control for a continuously variable transmission system which is suitable for vehicle use and which combines a belt-type continuously variable transmission unit with a planetary gear unit to provide both low and high modes for a variety of pulley ratios in a predetermined pulley-ratio range.

2. Detailed Description of the Prior Art

In recent years, continuously variable transmission powertrains for vehicles have combined a belt-type continuously variable transmission unit with a planetary gear set to provide increased fuel efficiency and improved driving performance of the vehicle. Such a continuously variable transmission is disclosed, for example, in U.S. Pat. No. 4,644,820.

The belt-type continuously variable transmission unit conventionally employed in a continuously variable transmission powertrain has primary and secondary pulleys each comprising two sheaves, that is, a fixed sheave and a movable sheave, and a belt wound around the primary and secondary pulleys. By changing a pressure regulating the width of a sheave, i.e. by moving the movable sheave relative to its mating fixed sheave, the effective diameter of the sheave and the pulley ratio can be changed. More specifically, the pulley ratio is decreased when the pressure on the primary side movable sheave is raised. The pulley ratio is also increased when the pressure on the secondary side movable sheave is raised. The rotations of a sun gear and a carrier of the planetary gear set are controlled in accordance with the pulley ratio. In this way, the rotation of a ring gear and an output shaft, as an integral body, can be set in the normal direction, stopped or set in the reverse direction in order to establish forward drive, neutral or reverse, respectively.

The belt-type continuously variable transmission powertrain further includes two clutches and, by changing the clutch engagement from one to the other, a low mode with a high torque ratio and a high mode with a low torque ratio can be set within a limited pulley-ratio range, as is conventional.

In a continuously variable transmission system, the pulley ratio can be freely changed from a high value to a low one. Typically, the low mode is for forward drive at a low speed, neutral and reverse. At the same pulley ratios, the high mode provides a forward drive at a gradually increasing speed in a high speed range. That is to say, for a variety of pulley ratios, two modes, that is, the low mode and the high mode, are available. For this reason, if the clutch engagement state is changed from one to the other when the pulley ratio is not within a predetermined pulley-ratio range, the result is a jump shift. In this case, the vehicle state is switched from forward drive at a high speed to reverse. Of course, an unexpected shift into reverse represents a significant problem. Also, the vehicle state may change from forward drive at a high speed to forward drive at a low speed, which results in over revolution (racing) of the engine.

SUMMARY OF THE INVENTION

Accordingly, it is an object of the present invention to provide a continuously variable transmission system which is prevented from jump shifting within a predetermined pulley-ratio range, from any unexpected shift into reverse and from racing of the engine.

To solve the problems associated with the prior art as described above, the present invention provides a continuously variable transmission system including: an input shaft associated with an engine output shaft; an output shaft associated with vehicle wheels; a belt-type continuously variable transmission unit including a first pulley fixed to the input shaft, a second pulley on the side of the output shaft and a belt wound around the first and second pulleys; and a planetary gear set interposed between the input and output shafts. The torque flow path between the input and output shafts may be changed so that any pulley ratio in a pulley-ratio range of the belt-type continuously variable transmission unit is obtainable, from a low mode with a high torque ratio to a high mode with a low torque ratio. The continuously variable transmission system further includes: low-high switching means for switching operation between the low and high modes; detecting means for detecting the pulley ratio of the belt-type continuously variable transmission unit; and inhibition means for inhibiting switching between the low and high modes by preventing the low-high switching means from operating when the pulley ratio detected by the detecting means is within a predetermined pulley-ratio range.

According to the invention, the continuously variable transmission powertrain further includes a first clutch which is operated by a first hydraulic servo and is engaged to establish the low mode responsive to receipt of a hydraulic pressure, and a second clutch which is operated by a second hydraulic servo and is engaged to establish the high mode responsive to a hydraulic pressure. The low-high switching means has a low-high switching valve for a switching operation to selectively supply the hydraulic pressure to either of the first and second hydraulic servos.

The low-high switching-valve has a spool for switching the path of, supply of the hydraulic pressure to selectively supply the hydraulic pressure to either the first or the second hydraulic servo in accordance with an output signal from the detecting means, and the inhibition means has a lock member for locking the spool if the pulley ratio is within a predetermined pulley-ratio range.

The first and second pulleys are respectively provided with movable sheaves for changing the radial positioning of the belt within the pulley(s) (effective pulley diameter) and to thereby change the pulley ratio. The detecting means has a position detecting member which has a protrusion/indent portion formed thereon for engaging and disengaging one end of the lock member and is movable in association with one of the movable sheaves. The other end of the lock member serves to lock and unlock the spool by engaging and disengaging its one end with and from the protrusion/indent.

The planetary gear set comprises a first rotary element connected to the input shaft, a second rotary element connected to the second pulley and a third rotary element connected to the output shaft, and the input shaft and the first rotary element are connected to each other by the first clutch, and two of the first, second and third rotary elements are connected to each other by the second clutch.

In the configuration described above, when the detecting means detects a pulley ratio within a predetermined pulley-ratio range, the inhibition means prevents the low-high switching means from operating to switch between a low mode and a high mode. As a result, when the pulley ratio enters the predetermined pulley-ratio range in the low mode, the low mode is sustained and operation cannot be switched to the high mode. When the pulley ratio enters the predetermined pulley-ratio range in the high mode, on the other hand, the high mode is sustained and operation cannot be switched to the low mode. In either case, when the pulley ratio enters the predetermined pulley-ratio range in a certain mode, that mode is sustained and operation cannot be switched to the other mode.

It should be noted that it is desirable to set the predetermined pulley-ratio range, wherein switching is inhibited as described above, wherein otherwise a switch from the high mode to the low mode would undesirably risk engine racing and/or a shift into reverse. It is desirable as well to set the predetermined pulley-ratio range so that the vehicle runs at a high speed when in the high mode and operating within the predetermined pulley-ratio range.

BRIEF DESCRIPTION OF THE DRAWINGS

The foregoing and further objects, features and advantages of the invention will become apparent from the following description of preferred embodiments with reference to the accompanying drawings, wherein:

FIG. 5 is a table showing engagement of a low clutch ($C_L$) and a high clutch ($C_H$) in a variety of ranges;

FIGS. 9A and 9B are tables comparing primary and secondary sheave pressures on a belt in low mode and in high mode, respectively.

DETAILED DESCRIPTION OF THE PREFERRED EMBODIMENTS

Figure 1:
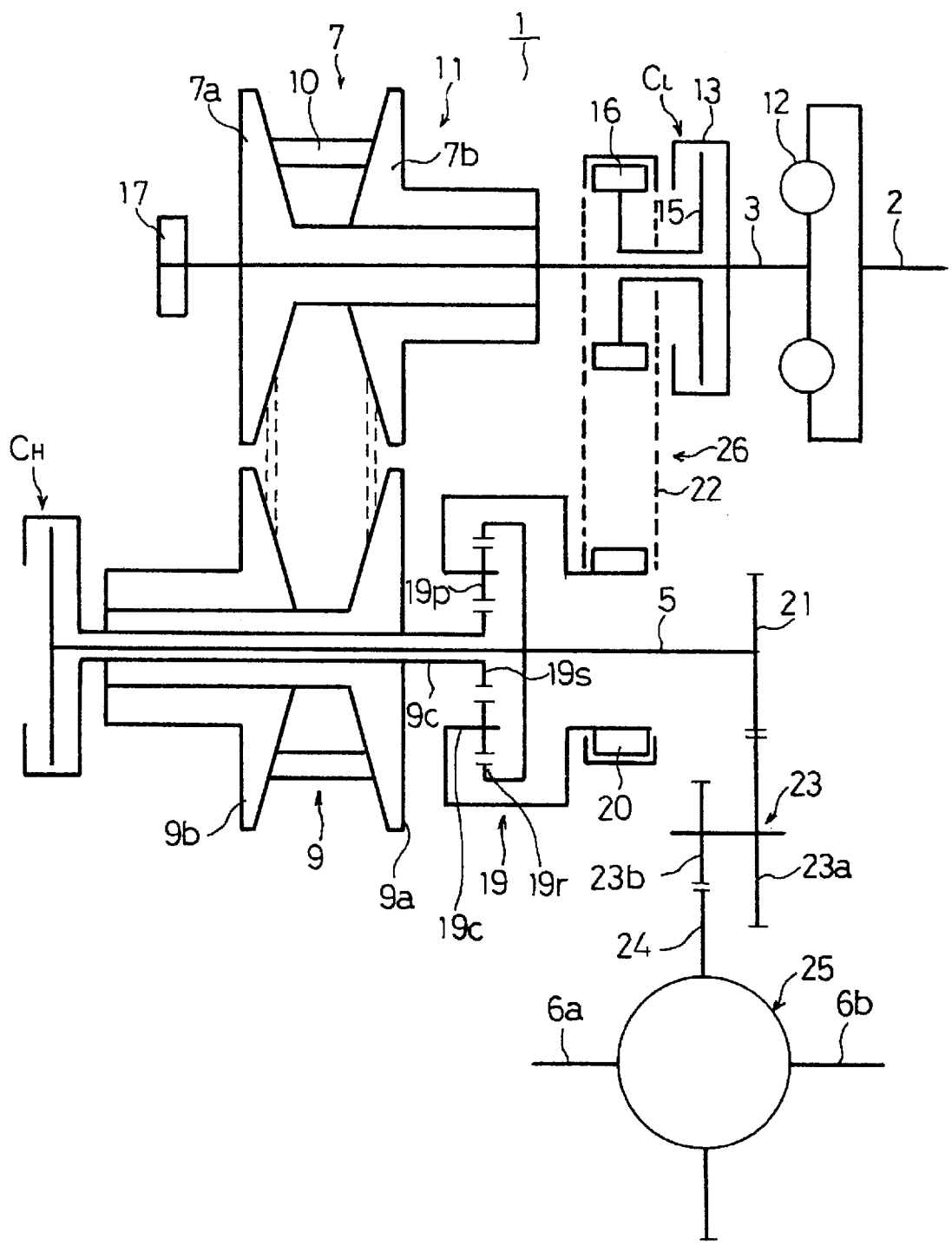
FIG. 1 is a skeletal diagram of a powertrain including a continuously variable transmission unit in accordance with one embodiment of the present invention.

An entire powertrain including a continuously variable transmission unit, in accordance with one embodiment of the invention, is shown in FIG. 1. As shown in FIG. 1, an automatic continuously variable transmission system 1, which is referred to hereafter simply as a "continuously variable transmission," includes a first shaft 3 linked to an engine crank shaft 2 through a damper 12. A second shaft 5 is connected by gearing through a differential 25 to third right and left wheel shafts 6a and 6b supporting the vehicle front wheels. The first shaft 3 supports a primary (first) pulley 7 while the second shaft 5 supports a secondary (second) pulley 9. A belt 10 is wound around these primary and secondary pulleys 7 and 9 to form the belt-type continuously variable transmission unit 11.

The input-side member 13 of a low clutch $C_L$ is fixed on the first shaft 3 while the output-side member 15 of clutch $C_L$ is rotatably supported by the first shaft 3. A primary-side sprocket 16 serving as a chain drive member is integral with the output-side member 15. Stationary fixed sheave 7a of the primary pulley 7 is fixed to the first shaft 3 and an oil pump 17 is attached to the end of the first shaft 3. A movable sheave 7b of the primary pulley 7 is supported by the fixed sheave 7a for sliding movement relative to the axis of shaft 3.

The secondary pulley 9 is rotatably supported by the second shaft 5. The secondary pulley 9 includes a stationary sheave 9a, a movable sheave 9b slidably supported by the fixed sheave 9a and a secondary shaft 9c integral with the fixed sheave 9a. A high clutch $C_H$ is provided between the second shaft 5 and the secondary shaft 9c. A planetary gear set 19 is provided on the second shaft 5 and a secondary-side sprocket 20 is rotatably supported by the planetary gear set 19. An output gear 21 is fixed on one end of the second shaft 5.

The planetary gear set 19 includes a sun gear 19s, a ring gear 19r, a pinion 19p, engaged with both the sun 19s and ring gear 19r, and a single pinion 19p rotatably mounted on carrier 19c. The sun gear 19s is linked to the secondary shaft 9c, serving as a second rotary element while the ring gear 19r is linked to the second shaft 5, serving as a third rotary element. The carrier 19c is connected to the secondary-side sprocket 20 for rotation therewith and serves as a first rotary element. An endless member 22, such as a silent chain, a roller chain or a timing belt, is wound around the primary-side and secondary-side sprockets 16 and 20.

The gear 21 fixed on the second shaft 5 is engaged with a large gear 23a of a speed reducing gear unit 23 and a small gear 23b of the speed reducing gear unit 23 is engaged with a ring gear 24 of a differential mechanism 25. The differential mechanism 25 outputs differential rotation to each of the left and right wheel shafts 6a and 6b constituting the third shaft 6.

Operation of the powertrain will now be explained with reference to FIGS. 1, 2, 3, 4 and 5. The rotation of the engine crank shaft 2 is transmitted to the first shaft 3 by way of the damper 12. In the low mode, in which the low clutch $C_L$ is engaged while the high clutch $C_H$ is disengaged, the rotation of the first shaft 3 is transmitted to the primary pulley 7 and also transmitted to the first rotary element 19c of the planetary gear set 19 by way of the chain drive unit 26 including the primary-side sprocket 16, the chain 22 and the secondary-side sprocket 20. The rotational speed of the primary pulley 7 is being continuously changed by adjustment of the pulley ratio of the primary pulley 7 to the secondary pulley 9 by changes in the axial forces thereon applied by means such as hydraulic servos. Subject to such regulation, the torque of the primary pulley 7 is transmitted to the secondary pulley 9. The variable rotation of the secondary pulley 9 is, in turn, transmitted to the sun gear 19s of the planetary gear set 19.

Figure 2:
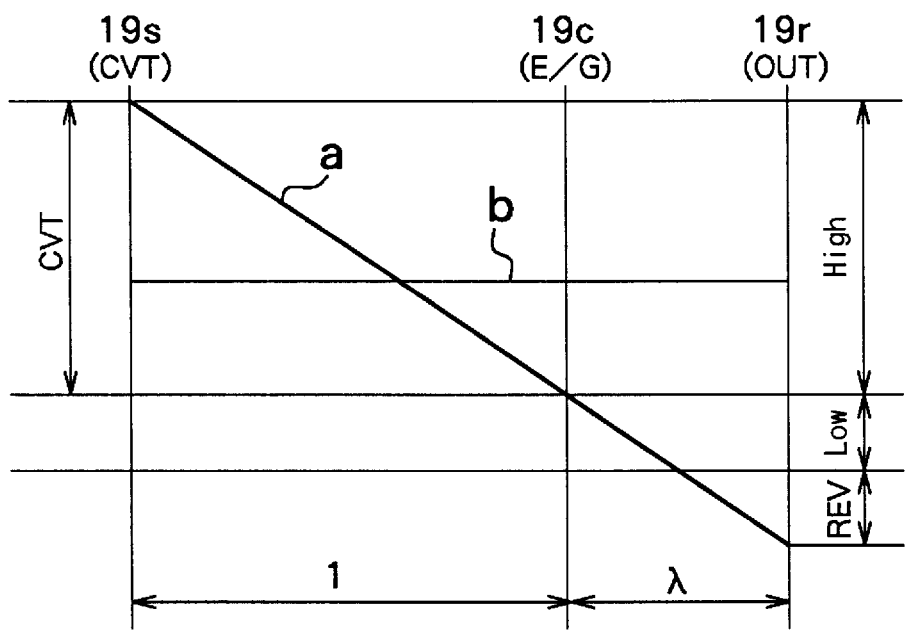
FIG. 2 is a speed diagram of operation of the powertrain shown in FIG. 1.

In the planetary gear set 19, as shown in the speed diagram of FIG. 2, the carrier 19c, to which rotation at a constant speed is input through the chain drive unit 26, becomes a reaction element, transmitting the continuously variable speed rotation from the belt-type continuous variable transmission unit (CVT) 11 to the sun gear 19s. The rotational inputs of the carrier 19c and the sun gear 19s are combined before being transmitted to the second shaft 5 by way of the ring gear 19r. Since the ring gear 19r, a rotary element which is not a reaction support element, is connected to the second shaft 5 for rotation therewith, the planetary gear set 19 creates torque circulation and, at the same time, the sun gear 19s and the carrier 19c rotate in the same direction. As a result, the second shaft 5 rotates in the forward (Low) and reverse (Rev) directions, crossing the zero rotational speed in transition therebetween. That is to say, in normal, i.e. forward, rotational direction of the second shaft 5, the belt-type continuously variable transmission unit 11 transmits torque from the secondary pulley 9 to the primary pulley 7 but, with reverse direction (backward direction) rotation of the second shaft 5, torque is transmitted from the primary pulley 7 to the secondary pulley 9.

In the high mode, in which the low clutch $C_L$ is disengaged while the high clutch $C_H$ is engaged, the transmission of power to the planetary gear set 19 by way of the chain drive unit 26 is cut off. In this high mode, the engagement of the high clutch $C_H$ puts the planetary gear set 19 in an integrally rotating state. As a result, the rotation of the first shaft 3 is transmitted to the second shaft 5 by way of the belt-type continuously variable transmission unit 11 and the high clutch $C_H$. That is to say, 25 the belt-type continuously variable transmission 11 transmits power from the primary pulley 7 to the secondary pulley 9. At the same time, the rotation of the second shaft 5 is transmitted to the differential apparatus 25 by way of the output gear 21 and the speed reducing gear unit 23, as well as to the right and left front wheels by way of the right and left shafts 6a and 6b, respectively.

Figure 3:
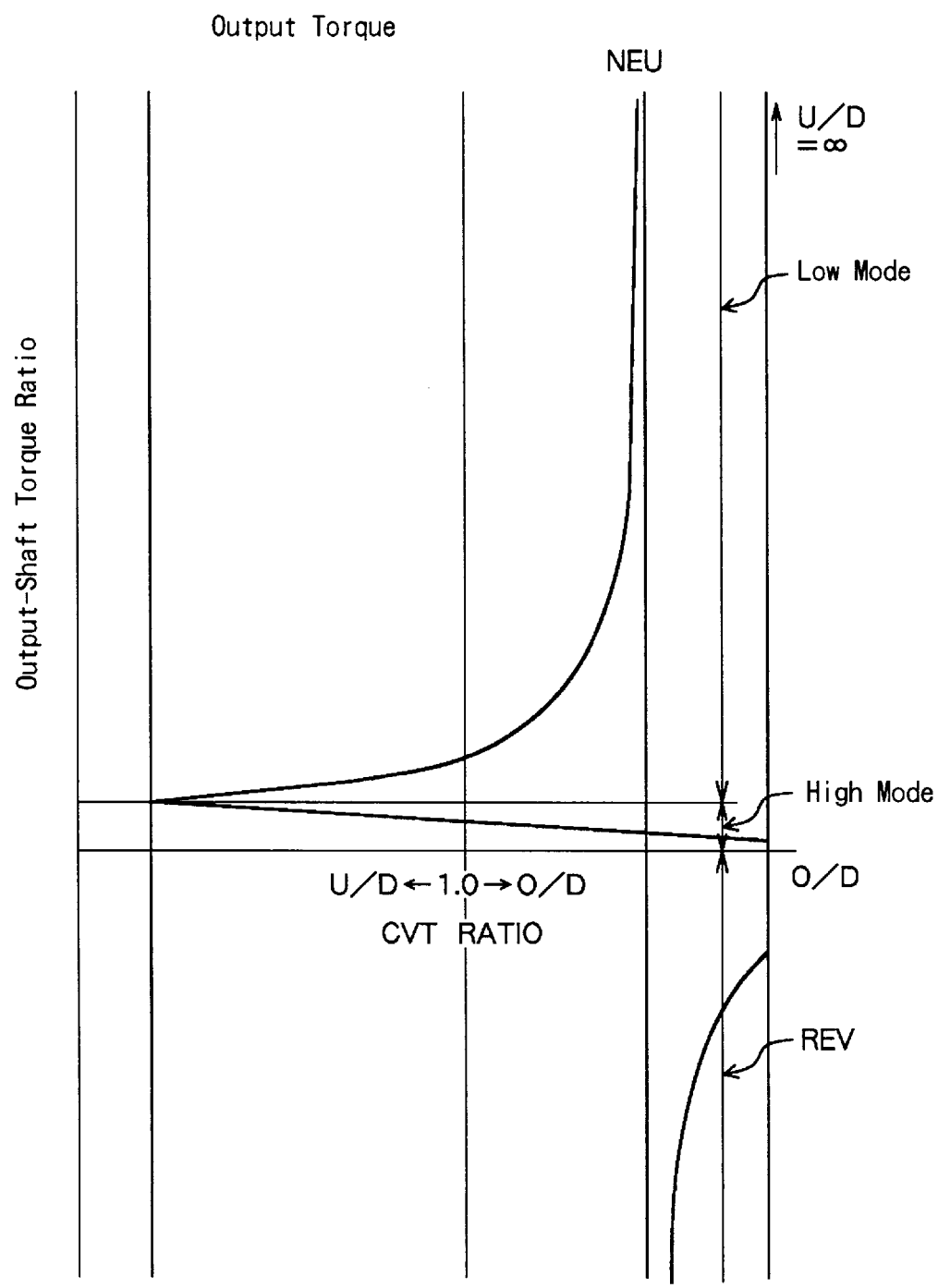
FIG. 3 is a graph of the output torque ratio versus the pulley ratio (CVT ratio) in the belt-type continuously variable transmission included in the powertrain as shown in FIG. 1.

As indicated by FIGS. 2–5, in the low mode wherein the CVT 11 is at the O/D limit, shown as line (a) in FIG. 2, because the sun gear 19s is rotating at maximum speed, the rotation of the ring gear 19r is in the reverse direction relative to the direction of rotation of the carrier 19c, which is rotating at a constant speed, and this reverse (REV) rotation is transmitted to the second shaft 5. As the CVT 11 shifts toward the U/D (under-drive) direction, the rotational speed in the reverse direction decreases until reaching a neutral position (an NEU position) in which the rotational speed of the second shaft 5 is reduced to zero at a predetermined pulley ratio determined by the gear ratios of the planetary gear set 19 and the chain drive unit 26. In addition, as the CVT 11 shifts in the U/D (under-drive) direction, the rotation of the ring gear 19r is switched to the normal (forward) direction, and this rotation in the normal direction is transmitted to the second shaft 5. At this time, the torque produced by the second shaft 5 increases to an infinite value in a region in close proximity to the neutral (NEU) position, as seen in FIG. 3.

Figure 4:
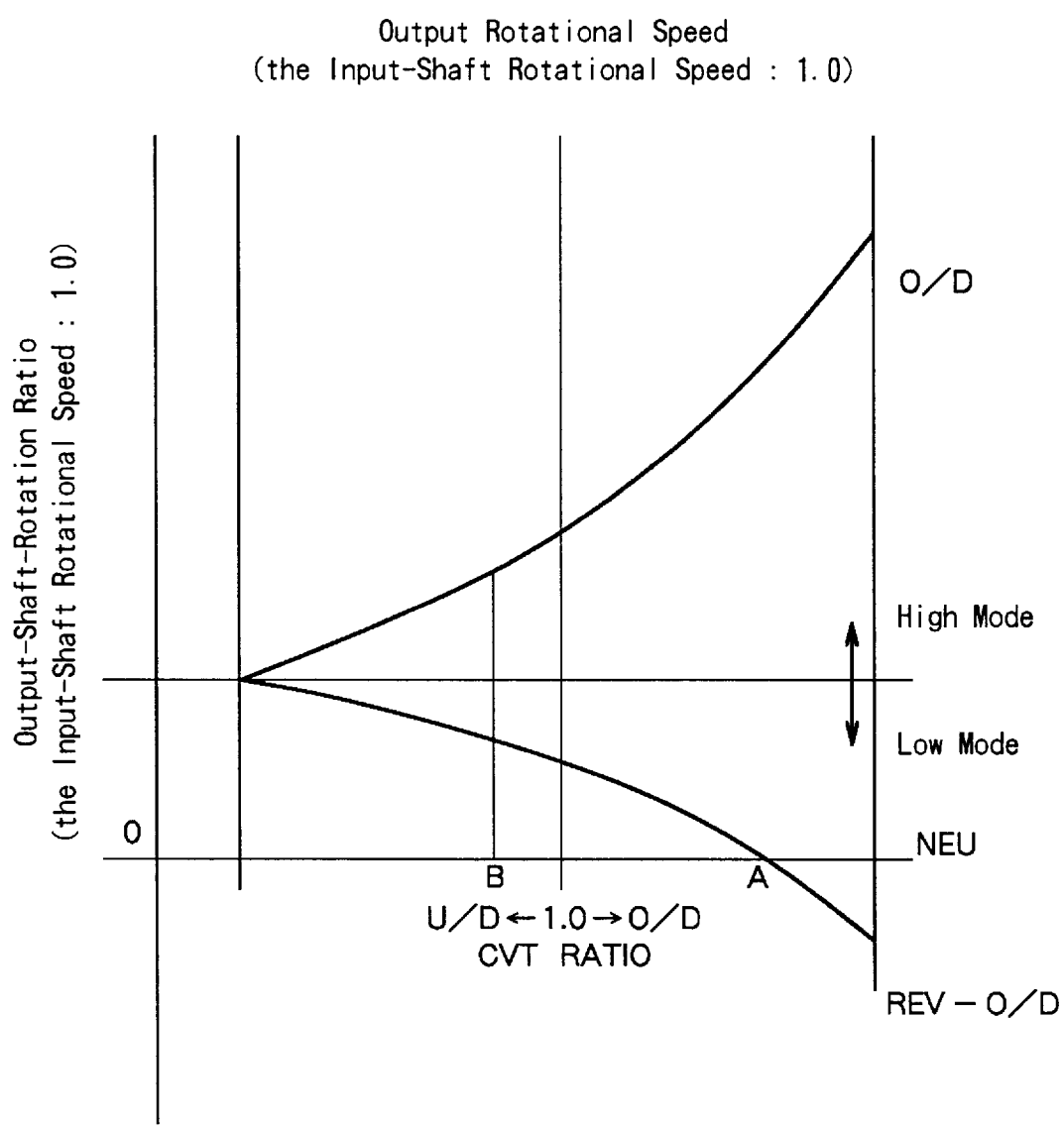
FIG. 4 is a graph of the output rotational speed versus the pulley ratio (CVT ratio) in the belt-type continuously variable transmission included in the powertrain shown in FIG. 1.

When the CVT 11 is at the U/D limit the high clutch $C_H$ is engaged and operation switches to the high mode. In addition, as shown in FIGS. 3 and 4, at a pulley ratio where a switch is effected from the low mode to the high mode, the output torque and the output rotational speed are continuous. In the high mode, the output rotation of the CVT 11 is transmitted to the second shaft 5 as is. As a result, the speed line is parallel to the horizontal axis as represented by line (b) in the speed diagram of FIG. 2. As the CVT 11 shifts in the O/D direction, the rotation of the second shaft 5 also changes in the O/D direction, reducing the transmitted torque by an amount corresponding to the increase in rotational speed. It should be noted that λ shown in FIG. 2 is a ratio of the sun gear teeth count Zs to the ring gear teeth count Zr (that is, Zs/Zr).

Figure 6:
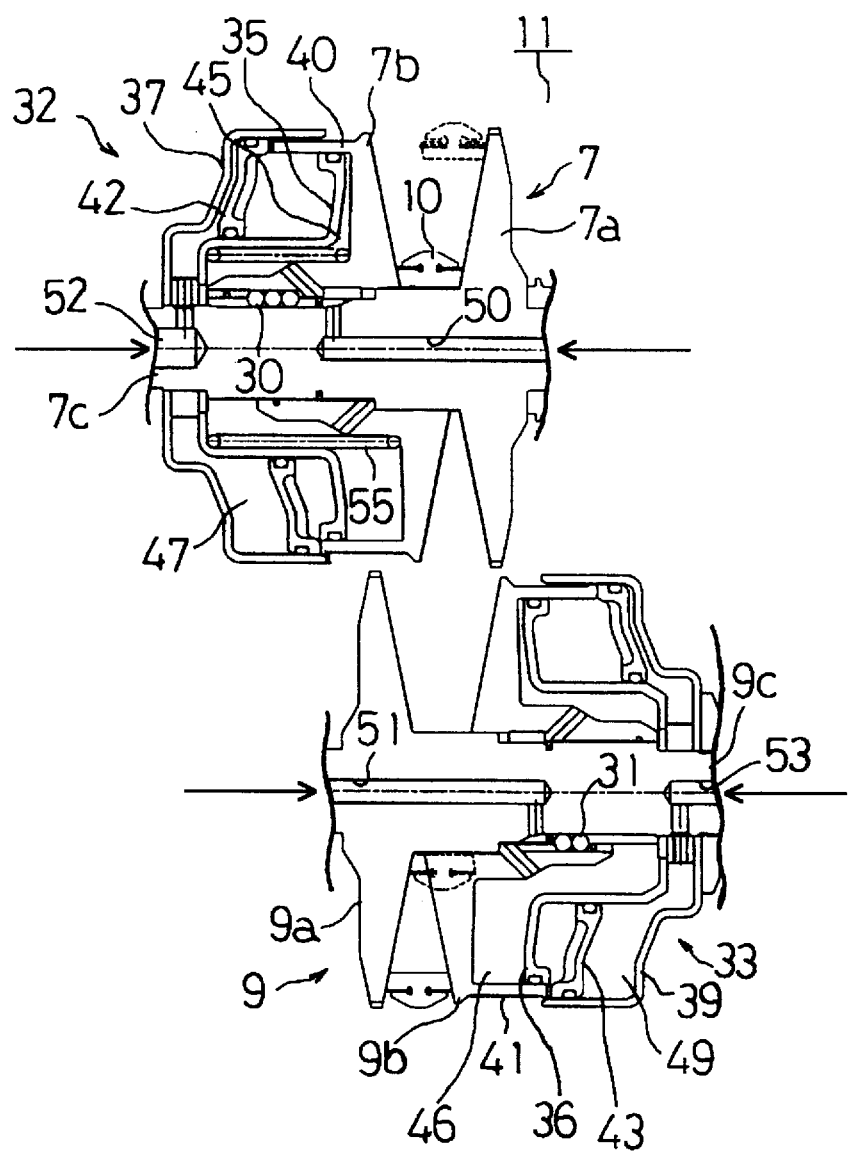
FIG. 6 is a cross-sectional view of double chamber-type hydraulic servos which operate the primary and secondary pulleys, respectively, in the belt-type continuously variable transmission unit included in the embodiment of FIG. 1.

As shown in FIG. 6, the movable sheave 7b of the primary pulley 7 is slidably supported, for movement along the shaft axis, by a boss 7c of the fixed sheave 7a of the primary pulley 7 through a ball spline 30. In the same manner, the movable sheave 9b of the secondary pulley 9 is slidably supported by a boss 9c of the fixed sheave 9a of the secondary pulley 9, through a ball spline 31. On the back surface of the movable sheave 7b, a primary-side hydraulic servo 32 serves to apply an axial force to the primary pulley 7. Similarly, on the back surface of the movable sheave 9b, a secondary-side hydraulic servo 33 serves to apply an axial force to the secondary pulley 9. The primary-side hydraulic servo 32 includes a partition member 35 fixed to the fixed sheave 7c, a cylinder member 37, a drum member 40 fixed to the back surface of the movable sheave 7b and a second piston member 42. Likewise, the secondary-side hydraulic servo 33 is composed of a partition member 36 fixed to the fixed sheave 9c, a cylinder member 39, a drum member 41 fixed to the back surface of the movable sheave 9b and a second piston member 43. The partition member 35 is hydraulically sealed to the drum member 40. The second piston member 42 is sealed between and slides relative to the cylinder member 37 and the partition member 35 to form a double piston structure including a first hydraulic chamber 45 and a second hydraulic chamber 47. In the same manner, sliding hydraulic seals are provided between the partition member 36 and both the drum member 41 and the second piston member 43. Thus, the cylinder member 39 and the partition member 36 form a double piston structure including a first hydraulic chamber 46 and a second hydraulic chamber 49.

The pressure in the first hydraulic chamber 45 of the primary-side hydraulic servo 32 acts on the back surface of the movable sheave 7b which is thereby operated as a piston on the primary side. Similarly, the pressure in the first hydraulic chamber 46 of the secondary-side hydraulic servo 33 acts on the back surface of the movable sheave 9b which is thereby operated as a piston on the secondary side. The effective pressure receiving area on the back surface of sheave 7b on the primary side is equal to the effective pressure receiving area on the back surface of sheave 9b on the secondary side. Hydraulic passages 50 and 52, for feeding oil pressures, respectively, to the first and second hydraulic chambers 45 and 47, are formed in the boss 7c of the fixed sheave 7b on the primary side. By the same token, hydraulic passages 51 and 53, for feeding oil pressures, respectively, to the first and second hydraulic chambers 46 and 49 are formed in the boss 9c of the fixed sheave 9a on the secondary side. A spring 55 for preloading is provided in the first hydraulic chamber 45 of the primary-side hydraulic servo 32.

Figure 7:
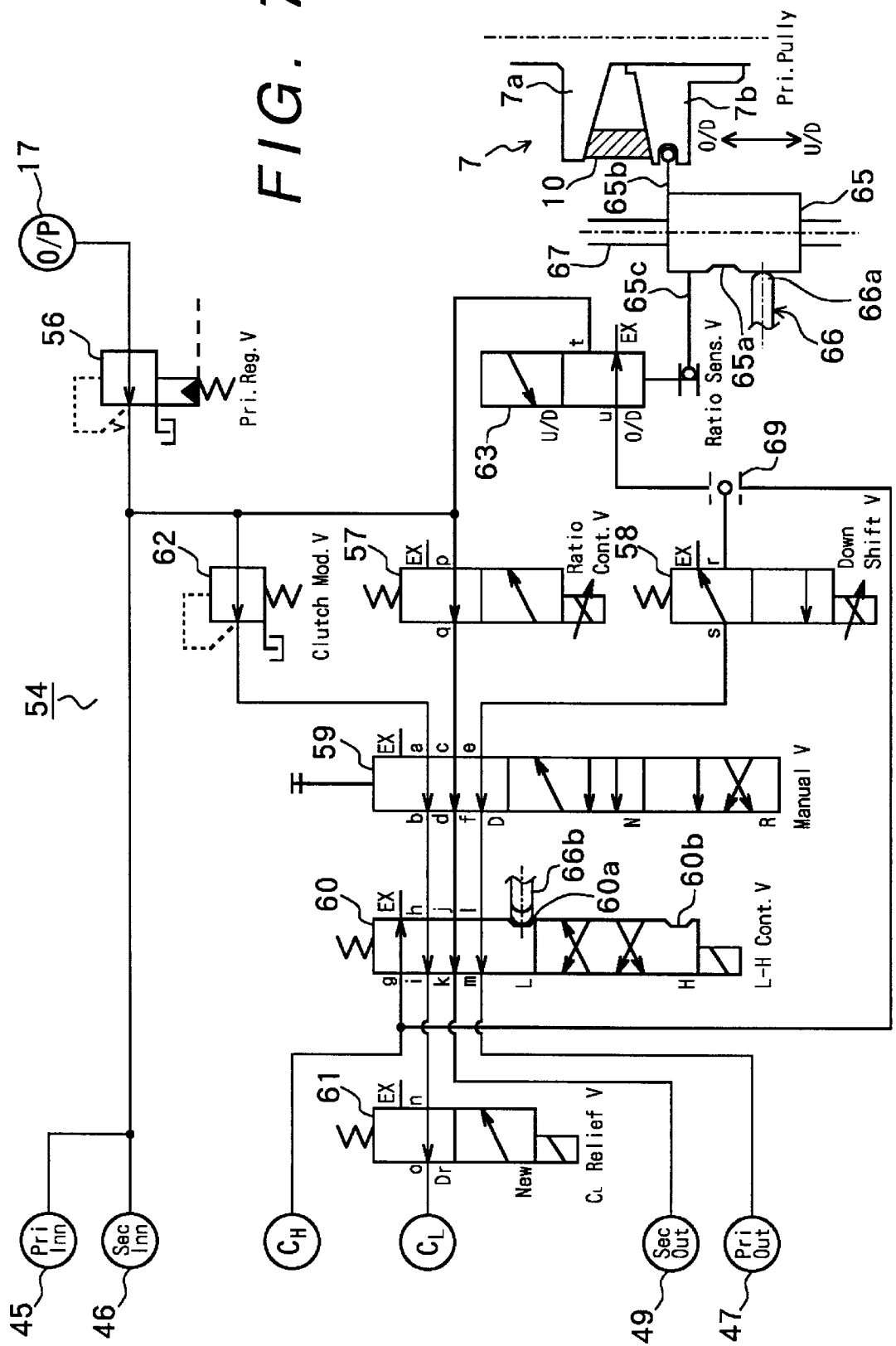
FIG. 7 is a diagram of a hydraulic circuit for control of powertrain of FIG. 1.
Figure 8:
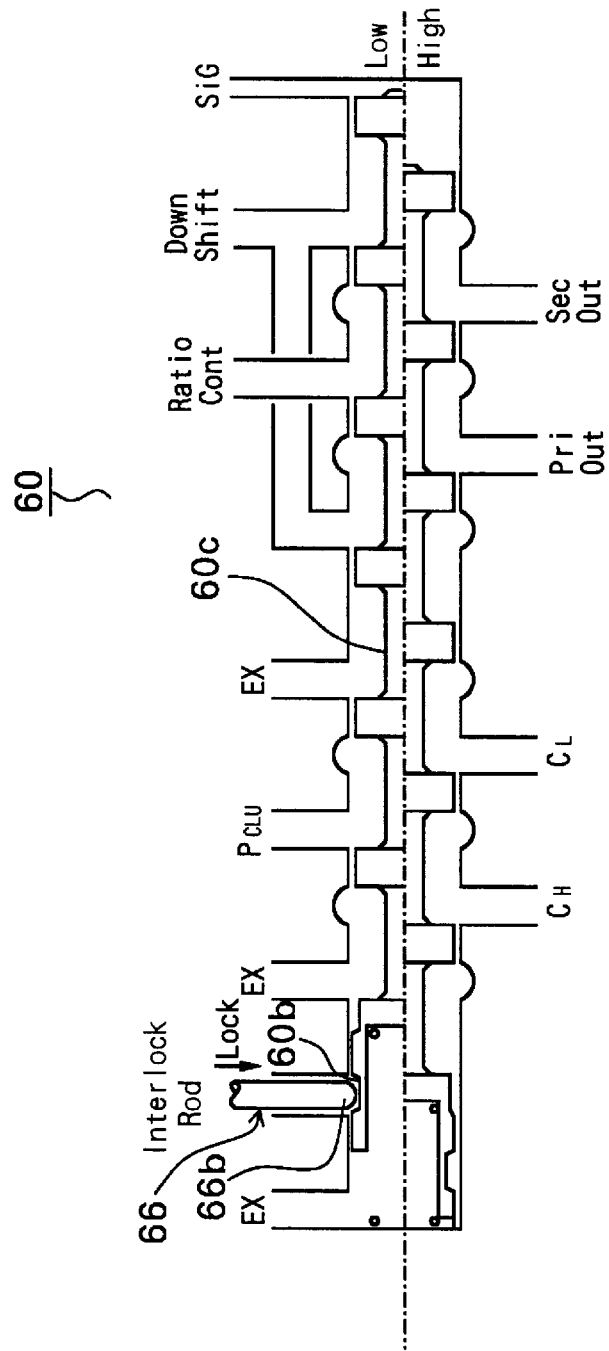
FIG. 8 is a schematic diagram of a low-high control valve and an interlock rod.

As shown in FIG. 7, the hydraulic control system 54 employed in the present embodiment includes a primary regulator valve 56, a ratio control valve 57, a down-shift relief valve 58, a manual valve 59, a low-high control valve (or a low-high switching valve) 60, a low clutch relief valve 61 and a clutch modulation valve 62. Details of the low-high control valve 60 are shown in FIG. 8. Furthermore, the hydraulic control system 54 also includes a ratio sensing valve 63, a sensor shoe 65 used as a detecting means (position detecting means) and an interlock rod 66 serving as inhibition means (lock member).

As shown in FIG. 8, the low-high control valve 60 has a spool 60c for switching a hydraulic pressure supply path in accordance with on and off operations of a solenoid valve (not shown), responsive to on/off signals based on the pulley ratio determined from the rotational speeds of the pulleys 7 and 9 and supplied to the solenoid valve. The spool 60c has indents 60a and 60b.

Referring again to FIG. 7, the sensor shoe 65 is slidably supported by a guide member 67 arranged parallel to the axis of the primary pulley 7. Two linkage members 65b and 65c protrude from the sensor 65. The linkage member 65b is engaged with the movable sheave 7b of the primary pulley 7 while the linkage member 65c is engaged with the ratio sensing valve 63. With this arrangement, therefore, as the movable sheave 7b moves along the shaft in the O/D or U/D direction, the distance through which the movable sheave 7b moves is transmitted to the ratio sensing valve 63 as is through the sensor shoe 65.

Furthermore, an indent 65a is formed on the sensor shoe 65. The base end 66a of an interlock rod 66, selectively engages within and disengages from the indent 65a. The interlock rod 66 is installed passing through a valve body. The other end 66b of the interlock rod 66 engages within and disengages from the indents 60a and 60b of the low-high control valve 60. FIG. 7 shows the interlock rod 66 split into the base end 66a and opposite end 66b. It should be noted, however, that in actuality, the interlock rod 66 is a single rod. When the base end 66a of the interlock rod 66 is engaged within the indent 65a of the sensor shoe 65, the opposite end 66b is engaged in neither the indent 60a nor the indent 60b of the low-high control valve 60. Instead, the opposite end 66b is brought into contact with the surface of the low-high control valve 60 outside of the indents. When the base end 66a of the interlock rod 66 is disengaged from the indent 65a of the sensor shoe 65 and brought into contact with the surface of the sensor shoe 65, on the other hand, the opposite end 66b is engaged with either the indent 60a or the indent 60b of the low-high control valve 60.

Next, the operation of the hydraulic control system 54 will be explained by reference to FIG. 7.

Operations in the following modes and ranges will be explained in the following order:

(1) D range L mode (Low mode in drive range)
(2) D range H mode (High mode in drive range)
(3) R range (Reverse range)
(4) N and P ranges (Neutral and parking ranges)

A first pulley ratio A shown in FIG. 4 is the pulley ratio in neutral and a second pulley ratio B is greater than the first pulley ratio A. A vertical line passing through the second pulley ratio B is the border between a region with high pulley ratios on the left side of the figure and a region with low pulley ratios on the right side of the figure. The low and high modes of the drive (D) ranges (1) and (2) are set by changing control between the regions on the left and right sides of the second pulley ratio B. By changing the control in this way, as will be described later, a down-shift is inhibited in the low mode of the drive range and in the reverse (R) range in the region below the second pulley ratio B. Also in the region below the second pulley ratio B, a jump from the high mode of the drive D range to the low mode of the drive range and to the reverse range is inhibited.

In any one of the modes/ranges (1) to (4) described above, hydraulic pressure from the oil pump 17 is appropriately regulated by the primary regulator valve 56 and output from an output port (v) thereof as shown in FIG. 7. At the same time, the regulated hydraulic pressure is also supplied to the first hydraulic chambers 45 and 46 of the hydraulic servos 32 and 33, respectively. The hydraulic pressures in the first hydraulic chambers 45 and 46 are controlled to be equal to each other. The regulated hydraulic pressure is also supplied to the clutch modulation valve 62. Then, a hydraulic pressure output by the clutch modulation valve 62 is selectively supplied to the low clutch $C_L$ or to the high clutch $C_H$ except in the N and P ranges (4). Operations in the modes/ranges (1) to (4) will now be described in sequence with reference to FIGS. 4 and 7 as well as to the table shown in FIG. 9.

(1) L mode in drive (D) range

Equal hydraulic pressures are supplied to the first hydraulic chambers 45 and 46, respectively. The low clutch $C_L$ is engaged and, in an up-shift, a hydraulic pressure is further supplied to the second hydraulic chamber 49. In a down-shift, a hydraulic pressure is supplied to the second hydraulic chamber 47 but, in the region below the second pulley ratio B, the supply of the hydraulic pressure is halted, inhibiting the down-shift.

In an up-shift, the manual valve 59 is in the D range position, opening hydraulic paths between a port (a) and a port (b), a port (c) and a port (d), as well as between a port (e) and a port (f). In addition, the low-high control valve 60 is set at an L mode position, opening hydraulic paths between a port (h) and a port (i), a port (j) and a port (k), as well as between a port (l) and a port (m). At the same, a switching operation is carried out to open a hydraulic path between a port (g) and a drain port Ex of the low-high control valve 60.

The hydraulic pressure from the clutch modulation valve 62 is supplied to the low clutch $C_L$ by way of the ports (a) and (b) of the manual valve 59, the ports (h) and (i) of the low-high control valve 60 and ports (n) and (o) of the low clutch relief valve 61, to engage the low clutch $C_L$. In addition, the hydraulic pressure from the output port (v) of the primary regulator valve 56 is gradually increased by the ratio control valve 57 to a value corresponding to a target pulley ratio. The gradually increasing hydraulic pressure is then supplied to the second hydraulic chamber 49 through ports (p) and (q) of the ratio control valve 57, the ports (c) and (d) of the manual valve 59 and the ports (j) and (k) of the low-high control valve 60. It should be noted that, in this state, a hydraulic path between the port (g) of the low-high control valve 60 and the drain port Ex is opened as described above, hence putting the hydraulic chamber of the high clutch $C_H$ in a released state. In addition, the second hydraulic chamber 47 of the primary-side hydraulic servo 32 has a hydraulic path opened to a drain port Ex of the down-shift relief valve 58 by way of ports (m) and (l) of the low-high control valve (also referred to herein as "the low-high switching valve" or "low-high switching means") 60, the ports (f) and (e) of the manual valve 59 and a port (s) of the down-shift relief valve 58.

As a result, the low clutch $C_L$ is engaged and, at the same time, in the CVT 11, an axial force generated by the secondary-side hydraulic servo 33, in which hydraulic pressures are applied to both the first and second hydraulic chambers 46 and 49, exceeds the axial force generated by the primary-side hydraulic servo 32 in which a hydraulic pressure is applied to only the first hydraulic chamber 45. The axial force generated by the secondary-side hydraulic servo 33 is further increased gradually to increase the pulley ratio. At that time, the movable sheave 7b of the primary pulley 7 is moved to the U/D side. In this state, engine torque transmitted from the first shaft 3 to the carrier 19c of the planetary gear set 19, by way of the low clutch $C_L$ and the chain drive unit 26, is output to the second shaft 5 by way of the ring gear 19r, while the engine torque is being controlled in the CVT 11 by a predetermined pulley ratio through the sun gear 19s.

When an up-shift is continued, the pulley ratio is gradually increased. Before the pulley ratio reaches the second pulley ratio B shown in FIG. 4, however, the operation of the low-high control valve 60 under the on/off control of the solenoid 15 valve is inhibited. That is to say, in an up-shift, the movable sheave 7b of the primary pulley 7 is moved to the U/D side and the sensor shoe 65 associated with the movable sheave 7b is moved in the downward direction in the figure. Before the pulley ratio reaches the second pulley ratio B, however, the base end 66a of the interlock rod 66 is brought into contact with the surface of the sensor shoe 65 without becoming engaged in the indent 65a. As a result, the other end 66b of the interlock rod 66 opposite the base end 66a is engaged within the indent 60a of the low-high control valve 60, mechanically locking the low-high control valve 60 in a state sustaining the low mode.

As the up-shift brings the pulley ratio to the second pulley ratio B, the base end 66a of the interlock rod 66 becomes engaged within the indent 65a of the sensor shoe 65. The other end 66b on the opposite side is moved to the right in the figure, freeing it from engagement within the indent 60a of the interlock rod 66. As a result, at a pulley ratio above the second pulley ratio B, the operation of the low-high control valve 60 is enabled. It should be noted that, also in the high mode of the drive range, at a pulley ratio below the second pulley ratio B, the low-high control valve 60 is locked mechanically as will be described later.

A down-shift in the low mode of the drive range in the region below the second pulley ratio B is inhibited but enabled in the region above the second pulley ratio B. In the former region, the ratio sensing valve 63, which moves in association with the movable sheave 7b of the primary pulley 7 by way of the sensor shoe 65, is positioned as shown in the figure. In this state, the hydraulic pressure from the port (v) of the primary regulator valve 56 is halted by the ratio sensing valve 63, making it impossible to supply a hydraulic pressure necessary for a down-shift to the second hydraulic chamber 47. It should be noted that, also in this state, a hydraulic path between a port q of the ratio control valve 57 and the drain port Ex thereof is opened, allowing the hydraulic pressure of the second hydraulic chamber 49 to be drained to the port Ex by way of the ports (k) and (j) of the low-high control valve 60, the ports (d) and (c) of the manual valve 59 and the port (q) of the ratio control valve 57. As a result, a down-shift until Pri=Sec shown in FIG. 9 is enabled.

In the region above the second pulley ratio B, on the other hand, a down-shift is enabled by virtue of, among other components, the ratio sensing valve 63. That is to say, in the region above the second pulley ratio B, the movable pulley 7b of the primary pulley 7 is moved to the U/D side, driving the ratio sensing valve 63 downward in the drawing by way of the sensor shoe 65. As a result, since the hydraulic path between ports (t) and (u) of the ratio sensing valve 63 is opened, the hydraulic pressure from the primary regulator valve 56 is fed to the down-shift relief valve 58 by way of a check valve 69. The hydraulic pressure moves the down-shift relief valve 58 in the upward direction in the figure, opening a hydraulic path between port (r) and port (s) thereof. In this state, it becomes possible to supply a hydraulic pressure to the second hydraulic chamber 47 by way of the ports (e) and (f) of the manual valve 59 and the ports (l) and (m) of the low-high control valve 60. In other words, a down-shift is enabled.

It should be noted that, by properly setting the second pulley ratio B, in a region where a down-shift is required, it is possible to properly execute a down-shift. For example, if the second pulley ratio B is set in close proximity to the first pulley ratio A which corresponds to the neutral state, with a change gear ratio of the continuously variable transmission as a whole set at about the same value as the first gear ratio (the first speed) of an ordinary automatic transmission (A/T), the pulley ratio is fixed at the second pulley ratio B, allowing 25 an effective engine brake to function.

(2) H mode of drive (D) range

Equal hydraulic pressures are supplied to the first hydraulic chambers 45 and 46. The high clutch $C_H$ is engaged and, in an up-shift, a hydraulic pressure is further supplied to the second hydraulic chamber 49. In addition, in a down-shift, a hydraulic pressure is supplied to the second hydraulic chamber 47. In the region below the second pulley ratio B, the operation of the low-high control valve 60 is mechanically inhibited.

In the high mode of the drive (D) range, the manual valve 59 is placed at the D range position as shown in FIG. 7, as is the case with the low mode explained previously. However, the low-high control valve 60 is switched to the H mode position, opening hydraulic paths between the ports (h) and (g), the ports (j) and (m) and the ports (l) and (k), as well as a hydraulic path between the port (i) and the drain port Ex.

In this state, the hydraulic pressure from the output port (v) of the primary regulator valve 56 is supplied to the hydraulic servo of the high clutch $C_H$ by way of the ports (a) and (b) of the manual valve 59 and the ports (h) and (g) of the low-high control valve 60, thus engaging the high clutch $C_H$. In addition, the hydraulic pressure from the output port (v) of the primary regulator valve 56 is also supplied to the second hydraulic chamber 47 of the primary-side hydraulic servo 32 by way of the ports (p) and (q) of the ratio control valve 57, the ports (c) and (d) of the manual valve 59 and the ports (j) and (m) of the low-high control valve 60. It should be noted that, in this state, a hydraulic path between the port (i) of the low-high control valve 60 and the drain port Ex thereof is opened, thus putting the hydraulic chamber for the low clutch $C_L$ in a released state. In addition, the second hydraulic chamber 49 of the secondary-side hydraulic servo 33 has a hydraulic path opened to a drain port Ex of the down-shift relief valve 58 by way of the ports (k) and (l) of the low-high control valve (the "low-high switching valve" or "low-high switching means") 60, the ports (f) and (e) of the manual 5 valve 59 and a port (s) of the down-shift relief valve 58.

As a result, the high clutch $C_H$ is engaged and, at the same time, in the CVT 11, an axial force generated by the primary side hydraulic servo 32 in which hydraulic pressures are applied to both the first and second hydraulic chambers 45 and 47 exceeds an axial force generated by the secondary-side hydraulic servo 33 in which a hydraulic pressure is applied to only the first hydraulic chamber 46, putting the CVT 11 in an axial force state for torque transmission from the primary pulley 7 to the secondary pulley 9. In this state, by properly regulating the ratio control valve 57, the hydraulic pressure in the second hydraulic chamber 47 of the primary-side hydraulic servo 32 can be regulated. As a result, the axial force produced by the primary-side hydraulic servo 32 is also regulated to give an appropriate pulley ratio (that is, an appropriate torque ratio). In this state, torque transmitted from the engine to the first shaft 3 is properly changed by the CVT 11 in which transmission from the primary pulley 7 to the secondary pulley 9 is underway and further output to the second shaft 5 by way of the high clutch $C_H$.

In the high mode of the drive (D) range described above, 25 as the pulley ratio goes below the second pulley ratio B, the operation of the low-high control valve 60 becomes mechanically inhibited. This is because, at a pulley ratio equal to or greater than the second pulley ratio B, the movable sheave 7b of the primary pulley 7 is positioned on the U/D side shown in the figure and the base end 66a of the interlock rod 66 becomes engaged with the indent 65a of the sensor shoe 65. At the same time, the other end 66b of the interlock rod 66 is outside of the indent 60b of the low-high control valve 60 and moves to the right in the figure, enabling the operation of the low-high control valve 60. At a pulley ratio equal to or smaller than the second pulley ratio B, on the contrary, the movable sheave 7b of the primary pulley 7 is placed on the O/D side shown in the figure and the base end 66a of the interlock rod 66 is brought into contact with the surface of the sensor shoe 65 while, on the other hand, its other end 66b is engaged within the indent 60b of the low-high control valve 60. As a result, the low-high control valve 60 is mechanically locked in a state in which the high mode is sustained, with a switching operation inhibited.

That is to say, at a pulley ratio equal to or smaller than the second pulley ratio B, the operation of the low-high control valve 60 is mechanically inhibited, thus sustaining either the low mode or the high mode as is. As a result, at a high rotational speed of the second shaft 5, even if a signal is output to the solenoid valve to effect a switching operation from the high mode of the drive range to the low mode of the drive range, e.g. in the event of an electrical failure, the low-high control valve 60 will not operate, which effectively prevents racing of the engine and a shift into reverse.

In addition, in the high mode of the drive range, even at a pulley ratio equal to or smaller than the second pulley ratio B, a down-shift is never inhibited, unlike the case for the low mode of the drive range. That is to say, in the high mode of the drive range, in the region below the second pulley ratio B, output of hydraulic pressure from the output port (v) of the primary regulator valve 56 is prevented by the ratio sensing valve 63 which is in the state shown in FIG. 7. Thus, the hydraulic pressure is not supplied to the second hydraulic chamber 49 by way of the down-shift relief valve 58, the manual valve 59 and the low-high control valve 60. In place of the hydraulic pressure from the output port (v) of the primary regulator valve 56, however, a hydraulic pressure from the high clutch $C_H$ is supplied to the second hydraulic chamber 49 by way of the check valve 69, the ports (r) and (s) of the down-shift relief valve 58, the ports (e) and (f) of the manual valve 59 and the ports (l) and (k) of the low-high control valve 60. As a result, in the high mode of the drive (D) range, a down-shift is possible over the entire range of the pulley ratios.

(3) Reverse (R) range

In the reverse range, a predetermined hydraulic pressure is supplied to the first and second hydraulic chambers 45 and 47 of the primary-side hydraulic servo 32, the first hydraulic chamber 46 of the secondary-side hydraulic servo 33 and the hydraulic servo of the low clutch $C_L$ as shown in FIG. 7. That is to say, in the reverse range, the manual valve 59 is placed at an R range position and the low-high control valve 60 is in the L mode position as shown in the figure. In this state, hydraulic paths between the ports (a) and (b), the ports (c) and (f), as well as the ports (e) and (d) of the manual valve 59, are opened. In addition, much like the low mode described earlier, hydraulic paths between the ports (h) and (i), the ports (j) and (k), the ports (l) and (m), as well as the port (g) and the drain port Ex of the low-high control valve 60, are opened.

As a result, the hydraulic pressure from the output port (v) of the primary regulator valve 56 is supplied to the hydraulic servo of the low clutch $C_L$ by way of the ports (a) and (b) of the manual valve 59 and the ports (h) and (i) of the low-high control valve 60. The hydraulic pressure from the output port (v) of the primary regulator valve 56 is also supplied to the second hydraulic chamber 47 of the primary-side hydraulic servo 32 by way of the ports (p) and (q) of the ratio control valve 57, the ports (c) and (f) of the manual valve 59 and the ports (l) and (m) of the low-high control valve 60. In addition, a hydraulic path between the port (s) and the drain port Ex of the down-shift relief valve 58 is opened.

As a result, the low clutch $C_L$ is engaged and, at the same time, in the CVT 11, the axial force generated by the primary side hydraulic servo 32, with receipt of hydraulic pressures in both of its first and second hydraulic chambers 45 and 47, exceeds the axial force generated by the secondary-side hydraulic servo 33 in which a hydraulic pressure is applied to only the first hydraulic chamber 46, putting the CVT 11 in readiness for torque transmission from the primary pulley 7 to the secondary pulley 9. In this state, by properly regulating the ratio control valve 57, the hydraulic pressure in the second hydraulic chamber 47 of the primary-side hydraulic servo 32 is regulated. As a result, the axial force produced by the primary-side hydraulic servo 32 is also regulated to give an appropriate pulley ratio. In this state, the pulley ratio of the CVT 11 has a predetermined O/D value and engine torque from the first shaft 3 is transmitted to the carrier 19c of the planetary gear 19 by way of the low clutch $C_L$ and the chain drive unit 26. At the same time, an engine torque is also transmitted to the sun gear 19s by way of the CVT 11 wherein torque is being transmitted from the primary pulley 7 to the secondary pulley 9. Both the torques are combined in the planetary gear set 19 and output to the second shaft 5, as a rotation in the reverse direction, by way of the ring gear 19r.

In the reverse range, the supply of a hydraulic pressure to the down-shift relief valve 58 is inhibited by the sensor shoe 65 and the ratio sensing valve 63, as in the case of a pulley ratio equal to or smaller than the second pulley ratio B in the low mode of the drive range. As a result, a down-shift is also inhibited as well. It should be noted that, in the reverse range, engine braking is not particularly required. Thus, no problem is caused by inability to down-shift in reverse.

(4) Neutral (N) and parking (P) ranges

When the manual valve 59 is placed in the P range or N range position, both the low and high clutches $C_L$ and $C_H$ are disengaged and a predetermined hydraulic pressure is supplied to the first hydraulic chambers 45 and 46 of the primary-side and secondary-side hydraulic servos 32 and 33, respectively. This is because, in these ranges, hydraulic paths between the ports (c) and (d), the ports (e) and (f) as well as the port b and the drain port Ex of the manual valve 59 are open. The low-high control valve 60 remains in the low mode of the drive range described earlier. A hydraulic path between the port (q) and the drain port Ex of the ratio control valve 57 is opened and the ratio sensing valve 63 is held in the position shown in FIG. 7.

As a result, hydraulic pressure from the output port (v) of the primary regulator valve 56 is supplied only to the first hydraulic chamber 45 of the primary-side hydraulic servo 32 and the first hydraulic chamber 46 of the secondary-side hydraulic servo 33 and is not supplied to the second hydraulic chamber of either of the valves. Thus, the equal hydraulic pressures supplied only to the first hydraulic chambers 45 and 46 of the primary-side and secondary-side hydraulic servos 32 and 33, respectively, results in approximately equal axial forces working the movable sheaves of both the primary and secondary pulleys 7 and 9.

It should be noted that, in the low and high modes for the D, N and R ranges, a predetermined hydraulic pressure from the primary regulator valve 56 is supplied to the first hydraulic chambers 45 and 46 of the primary-side and secondary-side hydraulic servos 32 and 33 respectively, securing a predetermined axial force corresponding to a transmitted torque so as to prevent the belt from slipping. In addition, a regulated hydraulic pressure from the ratio control valve 57 is applied to either the second hydraulic chamber 47 of the primary-side hydraulic servo 32 or the second hydraulic chamber 49 of the secondary-side hydraulic servo 33 in order to adjust the ratio of the axial force of the primary pulley 7 to the axial force of the secondary pulley 9 so as to produce a predetermined pulley ratio.

In the embodiment described above, the second pulley ratio B is used as a threshold pulley ratio for inhibiting a down-shift in the low mode of the drive range as well as a threshold pulley ratio for mechanically inhibiting the operation of the low-high control valve 60 in the low and high modes of the drive range. It should be noted, however, that the threshold pulley ratios can also be set at values differing from each other. For example, the threshold pulley ratio for inhibiting a down-shift in the low mode of the drive range can be set at a value closer to the first pulley ratio A, while the threshold pulley ratio for mechanically inhibiting the operation of the low-high control valve 60 in the low and high modes of the drive range can be set at a value further from the first pulley ratio A. In any event, it is desirable to set the threshold pulley ratio for inhibiting a down-shift in the low mode of the drive range and the threshold pulley ratio for mechanically inhibiting the operation of the low-high control valve 60 in the low and high modes of the drive (D) range at values determined by actual running conditions of the vehicle.

In the embodiment described above, the sensor shoe 65 which moves in association with the movable sheave 7b of the primary pulley 7 is used as a detecting means for detecting the pulley ratio. It should be noted, however, that a sensor shoe which moves in association with the movable sheave 9b of the secondary pulley 9 can also be used as a detecting means for detecting the pulley ratio, instead of the sensor shoe 65.

According to the present invention, within the predetermined pulley-ratio range, the operation of switching from the low mode to the high mode and vice versa is inhibited, effectively avoiding a shift from forward drive to reverse drive and avoiding racing of the engine.

According to the present invention, by controlling the operation of the low-high switching valve, the operations of the hydraulic servos for engaging the two clutches can be controlled, preventing a switch in the engagement of the clutches from one to other and, thus inhibiting a switch from a low mode to a high mode and vice versa. In this way, the objectives of the present invention are achieved by a simple countermeasure, that is, by merely controlling the operation of the low-high switching valve.

According to the present invention, by mechanically locking the spool of the low-high switching valve by means of the lock member, switching from a low mode to a high mode and vice versa can be inhibited, resulting in reliable operation.

According to the present invention, the position detecting member associated with the movement of the movable pulley, which moves in accordance with a change in pulley ratio, and the lock member directly actuated by the position detecting member are used for locking and unlocking the spool, resulting in an even more reliable operation.

Further, according to the present invention, the operation of switching from the low mode to the high mode or vice versa as well as the forward drive, neutral and backward drive states can be implemented with ease by changing the engagement from the first clutch to the second clutch or vice versa and varying the pulley ratio.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A continuously variable transmission for a vehicle comprising:
   an input shaft for input of torque from an engine output shaft;
   an output shaft for output of torque to vehicle wheels;
   a belt-type continuously variable transmission unit comprising a first pulley driven by said input shaft, a second pulley mounted on said output shaft and a belt wound around said first and second pulleys;
   a planetary gear set interposed between said input and output shafts to provide a torque transmission path between said input and output shafts, said planetary gear set being shiftable to provide, for any pulley ratio in a first pulley-ratio range of said belt-type continuously variable transmission unit, a low mode with a high torque ratio and a high mode with a low torque ratio;
   low-high switching means for switching between said low and high modes;
   detecting means for detecting said pulley ratio of said belt-type continuously variable transmission apparatus; and
   inhibition means for inhibiting switching between said low and high modes by preventing said low-high switching means from operating if the pulley ratio detected by said detecting means is within a second pulley-ratio range.

2. A continuously variable transmission according to claim 1 further comprising:
   a first clutch and a first hydraulic servo for engaging said first clutch to establish said low mode responsive to a hydraulic pressure applied to said first hydraulic servo;
   a second clutch and a second hydraulic servo for engaging said second clutch to establish said high mode responsive to a hydraulic pressure applied to said second hydraulic servo; and
   wherein said low-high switching means has a low-high switching valve for switching operation to selectively supply said hydraulic pressure to one of said first and second hydraulic servos.

3. A continuously variable transmission according to claim 2
   wherein said low-high switching valve has a spool for switching a supply path of said hydraulic pressure to selectively supply said hydraulic pressure to one of said first and second hydraulic servos in accordance with an output signal from said detecting means; and wherein
   said inhibition means has a lock member for locking said spool if said pulley ratio is within said second range.

4. A continuously variable transmission according to claim 3
   wherein said first and second pulleys are each provided with movable sheaves for changing their effective diameter, thereby changing said pulley ratio;

wherein said detecting means has a position detecting member with engaging means formed thereon for engaging and disengaging a first end of said lock member, said position detecting member being movable in association with one of said movable sheaves; and wherein a second end of said lock member locks and unlocks said spool responsive to said engaging and disengaging of said position detecting member by said first end of said lock member.

5. A continuously variable transmission according to claim 2 wherein said planetary gear set comprises a first rotary element connectable to said input shaft for rotation therewith, a second rotary element connectable to said second pulley for rotation therewith and a third rotary element connectable to said output shaft for rotation therewith;

said input shaft and said first rotary element being selectively connected to each other by said first clutch; and two of said first, second and third rotary elements being selectively connected to each other by said second clutch.

6. A continuously variable transmission according to claim 1 wherein said first and second pulleys are each provided with movable sheaves for changing their effective diameter, thereby changing said pulley ratio;

wherein said detecting means has a position detecting member with engaging means formed thereon for engaging and disengaging a first end of said lock member, said position detecting member being movable in association with one of said movable sheaves; and wherein a second end of said lock member locks and unlocks said spool responsive to said engaging and disengaging of said position detecting member by said first end of said lock member.

7. A continuously variable transmission according to claim 6 wherein said engaging means is an indent, formed on an exterior surface of said position detecting member, for receiving said first end of said lock member and wherein said spool has an indent for receiving said second end of said lock member.

8. A continuously variable transmission according to claim 4 wherein said engaging means is an indent, formed on an exterior surface of said position detecting member, for receiving said first end of said lock member and wherein said spool has an indent for receiving said second end of said lock member.

* * * * *

UNITED STATES PATENT AND TRADEMARK OFFICE
CERTIFICATE OF CORRECTION

PATENT NO.  : 5,833,571
DATED       : November 10, 1998
INVENTOR(S) : TSUKAMOTO et al It is certified that error appears in the above-indentified patent and that said Letters Patent is hereby corrected as shown below:

<u>ON THE TITLE PAGE:</u>   Under "[30] Foreign Application Priority Date" insert --Dec. 15, 1975 [JP] Japan  7-327663--.

Col. 2, line 38, "of," should read --of--.
Col. 5, line 21, delete "25".
Col. 9, line 67, delete "25".
Col. 10, line 61, delete "25".

Signed and Sealed this

Twenty-eighth Day of September, 1999

Attest:

Q. TODD DICKINSON

*Attesting Officer*          *Acting Commissioner of Patents and Trademarks*